(12) United States Patent
Loukus et al.

(10) Patent No.: US 9,956,608 B2
(45) Date of Patent: May 1, 2018

(54) COMPOSITE ARTICLES, WEAR PLATES AND METHODS

(71) Applicant: REL, Inc., Calumet, MI (US)

(72) Inventors: Adam R. Loukus, Calumet, MI (US); Josh E. Loukus, Calumet, MI (US); Steven C. Dupay, Holland, MI (US)

(73) Assignee: REL, INC., Calumet, MI (US)

( * ) Notice: Subject to any disclaimer, the term of this patent is extended or adjusted under 35 U.S.C. 154(b) by 0 days. days.

(21) Appl. No.: 14/997,668

(22) Filed: Jan. 18, 2016

(65) Prior Publication Data

US 2016/0221076 A1    Aug. 4, 2016

Related U.S. Application Data (62) Division of application No. 13/841,281, filed on Mar. 15, 2013, now Pat. No. 9,238,390.

(60) Provisional application No. 61/744,557, filed on Sep. 28, 2012, provisional application No. 61/690,728, filed on Jul. 3, 2012.

(51) Int. Cl.
| | |
|---|---|
| *B22D 19/02* | (2006.01) |
| *B60D 1/01* | (2006.01) |
| *B62D 53/08* | (2006.01) |
| *C04B 35/622* | (2006.01) |

(52) U.S. Cl.
CPC ............ *B22D 19/02* (2013.01); *B60D 1/015* (2013.01); *B62D 53/08* (2013.01); *B62D 53/0885* (2013.01); *C04B 35/622* (2013.01); *Y10T 29/49988* (2015.01)

(58) Field of Classification Search
CPC .................. B22D 19/00; B22D 19/02
USPC .................... 164/91, 98, 100, 112
See application file for complete search history.

(56) References Cited

U.S. PATENT DOCUMENTS

| | | | |
|---|---|---|---|
| 2,676,617 | A | 4/1954 | Felger |
| 3,174,812 | A | 3/1965 | Widmer |
| 3,275,390 | A | 9/1966 | Franks |
| 3,704,924 | A | 12/1972 | Lowry |
| 3,924,909 | A | 12/1975 | Kent et al. |

(Continued)

FOREIGN PATENT DOCUMENTS

| | | |
|---|---|---|
| DE | 4418533 | 11/1995 |
| DE | 19609314 | 9/1997 |

(Continued)

OTHER PUBLICATIONS

"Communication Pursuant to Rules 161 and 162 EPC," for European Patent Application No. 13737096.1, dated Feb. 17, 2015 (2 pages).

(Continued)

*Primary Examiner* — Kevin P Kerns (57) ABSTRACT

A metal matrix composite article is described that includes a metal component, a ceramic component, and a lubricious component. The metal matrix composite article has a first surface and a second surface. The lubricious component is present in an amount that is highest at the first surface and is lowest at the second surface. The ceramic component is present in an amount that is highest at the first surface and is lowest at the second surface. The metal component is present in an amount that is highest at the second surface and is lowest at the first surface. In some cases, the metal matrix composite article is a wear plate for a fifth wheel hitch.

7 Claims, 10 Drawing Sheets

(56) References Cited

U.S. PATENT DOCUMENTS

| | | | |
|---|---|---|---|
| 4,121,853 A | 10/1978 | Mckay | |
| 4,169,635 A | 10/1979 | Szalay et al. | |
| 4,359,234 A | 11/1982 | Mittelstadt | |
| 4,457,531 A | 7/1984 | Hunger et al. | |
| 4,539,246 A * | 9/1985 | Landphair et al. | B22D 19/12 164/11 |
| 4,542,912 A | 9/1985 | St. Louis | |
| 4,752,081 A | 6/1988 | Reeners et al. | |
| 4,805,926 A | 2/1989 | Mamery et al. | |
| 5,066,035 A | 11/1991 | Athans et al. | |
| 5,165,714 A | 11/1992 | Kaim | |
| 5,167,271 A | 12/1992 | Lange et al. | |
| 5,263,856 A | 11/1993 | Huehn et al. | |
| 5,431,424 A | 7/1995 | Colwell | |
| 5,482,308 A | 1/1996 | Marcu et al. | |
| 5,522,613 A | 6/1996 | Heeb | |
| 5,534,044 A | 7/1996 | Prasad et al. | |
| 5,620,770 A | 4/1997 | Cork et al. | |
| 5,622,767 A | 4/1997 | Cork et al. | |
| 5,746,438 A | 5/1998 | Bergmann et al. | |
| 6,010,141 A | 1/2000 | Huntimer et al. | |
| 6,045,148 A | 4/2000 | Baumeister et al. | |
| 6,220,617 B1 | 4/2001 | Hunger et al. | |
| 6,623,024 B1 | 9/2003 | Alguera Gallego et al. | |
| 7,036,839 B2 | 5/2006 | Hungerink et al. | |
| 7,547,034 B2 | 6/2009 | Hungerink et al. | |
| 7,879,273 B2 | 2/2011 | Hungerink et al. | |
| 8,075,827 B2 | 12/2011 | Loukus et al. | |
| 8,602,438 B2 | 12/2013 | Stanifer et al. | |
| 9,238,390 B2 | 1/2016 | Loukus et al. | |
| 2005/0183909 A1 | 8/2005 | Rau et al. | |
| 2005/0217950 A1 | 10/2005 | Jolley et al. | |
| 2008/0164677 A1 | 7/2008 | Huntimer et al. | |
| 2012/0227624 A1 | 9/2012 | Loukus et al. | |
| 2013/0087420 A1 | 4/2013 | Fraley et al. | |
| 2013/0269901 A1 | 10/2013 | Loukus et al. | |
| 2013/0269902 A1 | 10/2013 | Loukus et al. | |
| 2014/0008893 A1 | 1/2014 | Loukus et al. | |

FOREIGN PATENT DOCUMENTS

| | | |
|---|---|---|
| DE | 19814276 | 10/1999 |
| EP | 0704369 | 4/1996 |
| JP | 2000317613 | 11/2000 |
| JP | 2009121509 | 6/2009 |
| WO | 2014008178 | 1/2014 |

OTHER PUBLICATIONS

"International Preliminary Report on Patentability," for PCT Application No. PCT/US2013/048909, dated Jan. 15, 2015 (10 pages).

"International Search Report and Written Opinion," for PCT/US2013/048909 dated Oct. 7, 2013 (12 pages).

"Response to Communication Pursuant to Rules 161 and 162 EPC," for European Patent Application No. 13737096.1, filed with the EPO Aug. 18, 2015 (28 pages).

* cited by examiner

202 — Separately forming a wear plate

204 — Separately forming a fifth wheel hitch plate

206 — Mechanically securing the wear plate to an upper surface of the fifth wheel hitch plate

COMPOSITE ARTICLES, WEAR PLATES AND METHODS

CROSS-REFERENCES

This application is a division of U.S. application Ser. No. 13/841,281 now U.S. Pat. No. 9,238,390, filed Mar. 15, 2013, and published Jan. 9, 2014 as Publ. No. 2014/0008893A1, which claims the benefit of U.S. Provisional Application No. 61/690,728, filed Jul. 3, 2012, and U.S. Provisional Application No. 61/744,557, filed Sep. 28, 2012, the content each of which is hereby incorporated by reference in its entirety.

BACKGROUND

A fifth wheel hitch is commonly found on a truck tractor (e.g., tractor-trailer cab) and is typically used for hauling large semi-trailers. The fifth wheel hitch includes a hitch bearing plate that is positioned in a substantially horizontal plane. A kingpin is coupled to a bearing plate located on a semi-trailer. The semi-trailer bearing plate is also positioned in a substantially horizontal plane. The hitch bearing plate receives the kingpin and locks it in place with a locking mechanism. During use, the semi-trailer bearing plate rests upon and pivots on the upper surface of the hitch bearing plate to permit the truck tractor and semi-trailer to articulate when turning while remaining engaged together. The hitch bearing plate bears a large portion of the semi-trailer weight and much friction occurs between the hitch bearing plate and the semi-trailer bearing plate during pivoting.

To reduce this friction, operators deposit a layer of grease between the hitch bearing plate and semi-trailer bearing plate. However, operators must continually replace this grease layer in order to prevent wear and damage to the respective bearing plates. In addition, grease is undesirable because it is environmentally unfriendly and very messy. Grease also attracts dirt and other debris, which in turn creates more friction between the respective bearing plates plus excessive wear to the same.

Others have replaced the layer of grease with a cover to the hitch bearing plate. The cover consists of a low-friction material such as a polymeric material. However, such a cover is made entirely of a single low-friction material that is not mechanically durable to withstand direct engagement of the kingpin during coupling of the tractor to the trailer or wear over a lifetime of the hitch bearing plate. As such, the cover often breaks or degrades such that it itself must often be replaced. Replacing a cover is a costly, time consuming procedure and is not desirable. Replacement of the cover is a costly and time consuming procedure plus the discarded non-recyclable polymeric material is environmentally unfriendly.

Thus, it would be desirable to provide a low-friction surface on a hitch bearing plate of a fifth wheel, such that the low-friction surface not only provides low friction but is also mechanically durable.

SUMMARY

Certain embodiments of the invention provides a metal matrix composite article. The metal matrix composite article can be any article desiring increased lubricity at a first surface while coupled with mechanical durability at a second surface. Thus, the metal matrix composite article can be any article having a first surface and a second surface. In some cases, the first surface and the second surface are opposite surfaces. In certain cases, the metal matrix composite article is an article that extends in a substantially horizontal plane, such as a plate or sheet. In other cases, the metal matrix composite article has a three-dimensional shape. Exemplary three-dimensional composite articles include cylinder liners, bearing journals, linear bearing guides, equipment ways and ball bearing guides.

The metal matrix composite article comprises, consists essentially of, or consists of a metal component, a ceramic component and a lubricious component. As used herein, the term "metal component" refers to any metal. In some cases, the metal component can include a metal selected from aluminum, magnesium, titanium, steel and alloys thereof. As used herein, the term "ceramic component" refers to any inorganic non-metal. In some cases, the ceramic component can include a component selected from silicon carbide, alumina, silica, zirconia and mixtures thereof. As used herein, the term "lubricious component" refers to any component that increases lubricity of the metal matrix composite article. In some cases, the lubricious component can include a component selected from graphite, tungsten disulfide, molybdenum disulfide or mixtures thereof.

The metal matrix composite article has a first surface and a second surface. The metal component, the ceramic component and the lubricious component each have a total volume fraction gradient extending in a direction from the first surface to the second surface. The total volume fraction gradient can range from steep gradients to shallow gradients. Also, each the lubricious component and the ceramic component have a decreasing total volume fraction gradient moving in a direction from the first surface to the second surface. The metal component has an increasing total volume fraction gradient moving in a direction from the first surface to the second surface. In some cases, the total volume fraction gradient extends along only a portion of the article moving from the first surface to the second surface. In other cases, the total volume fraction gradient extends entirely from the first surface to the second surface. While in still other cases, the total volume fraction gradient can be uniquely tailored to apply specific attributes in targeted areas. Finally, total volume fraction gradient can be a continuous gradient, a step gradient or a combination gradient thereof.

The lubricious component in the composite article has a total volume fraction gradient such that the first surface has a total volume fraction and the second surface has a total volume fraction, wherein the first surface total volume fraction is higher than the second surface total volume fraction. In some cases, the lubricious component can have a total volume fraction of between about 1% and about 20% at the first surface. Also, in certain cases, the lubricious component can have a second surface total volume fraction that is between about 0.1% and about 100% lower than at the first surface total volume fraction. The total volume fraction refers to the total volume fraction in comparison to the entire composite article volume (or entire wear plate volume in cases where the composite article is a wear plate). In some cases, the total volume fraction is measured using a standard SEM analyses.

Also, the ceramic component has a total volume fraction gradient such that the first surface has a total volume fraction and the second surface has a total volume fraction, wherein the first surface total volume fraction is higher than the second surface total volume fraction. In some cases, the ceramic component can have a total volume fraction of between about 20% and about 50% at the first surface. Also, in certain cases, the ceramic component can have a second surface total volume fraction that is between about 0.1% and about 100% lower than at the first surface total volume fraction. Further, in some cases, the lubricious component and the ceramic component can have the same total volume fraction gradient.

Finally, the metal component has a total volume fraction gradient such that the first surface has a total volume fraction and the second surface has a total volume fraction, wherein the second surface total volume fraction is higher than the first surface total volume fraction. The metal component can also have a total volume fraction of between about 80% and about 100% at the second surface. Also, in certain cases, the metal component can have a second surface total volume fraction that is between about 0.1% and about 60% greater than at the first surface total volume fraction.

In certain cases, the metal matrix composite article composite article is a wear plate for a fifth wheel hitch. Thus, certain embodiments of the invention provide a fifth wheel hitch including a wear plate. The fifth wheel hitch can be positioned in a load bed of a truck-tractor or other towing vehicle. The wear plate is positioned on an upper surface of a hitch bearing plate so that it directly contacts a semi-trailer bearing plate. The wear plate has an exposed first surface and a second surface that faces the hitch bearing plate. The first surface and the second surface are opposite surfaces. The exposed first surface has increased lubricity and the second surface has increased mechanical durability. Thus, the wear plate provides lubricious properties while also remaining mechanically durable for an extended period of time.

The wear plate can have any desired size, shape or configuration. Generally, the wear plate extends in a substantially horizontal plane. In some cases, the wear plate is a single component whereas in other cases, the wear plate includes two or more components. In certain cases, the wear plate is a single component that has a general horseshoe shape. In other cases, the wear plate includes two components, with each component having a substantially semi-circular shape or a substantially crescent shape. In still other cases, the wear plate is shaped to accommodate a shape of a corresponding bearing plate.

The wear plate can secure to the hitch bearing plate by any appropriate means. In some embodiments, the wear plate is first formed separately from the hitch bearing plate. The wear plate is then mechanically secured to the hitch bearing plate using any mechanical securing mechanism known in the art. In some cases, the wear plate is secured to the hitch bearing plate using one or more bolts. In other cases, the wear plate is welded to the hitch bearing plate using any welding mechanism known in the art. In other embodiments, the wear plate is formed integrally to the hitch bearing plate. In these cases, the wear plate can be an integral part of the hitch bearing plate.

The wear plate comprises, consists essentially of or consists of a metal component, a ceramic component and a lubricious component and has total volume fraction gradients as described above with reference to the metal matrix composite article. In some embodiments, the wear plate has a first region and a second region. The first region contains the lubricious component, the ceramic component and the metal component, wherein each component has a specified total volume fraction gradient. The second region contains only the metal component and thus does not have a total volume fraction gradient. Also, the first region includes the first surface that is exposed and the second region contains the second surface that faces the hitch bearing plate. In this embodiment, the second region serves as a monolithic backing to the first region. The monolithic backing can have a generally smooth interface with the first region or a textured interface with the first region. Such a monolithic backing provides additional mechanical durability to the wear plate. Also, such a textured interface can help promote adhesion between the first region and the second region.

Other embodiments of the invention provide a wear plate preform having a ceramic component and a lubricious component in specified density gradients. The wear plate preform can have a ceramic component and a lubricious component, wherein the wear plate preform has a first surface and a second surface, wherein the lubricious component has a density that is highest at the first surface and is lowest at the second surface, and wherein the ceramic component has a density that is highest at the first surface and is lowest at the second surface. The lubricious component can have a density of between about 5% and about 20% at the first surface. In other cases, the lubricious component has a density at the second surface that is between about 0.1% and about 20% lower than at the first surface. Likewise, the ceramic component can have a density of between about 80% and about 95% at the first surface. In other cases, the ceramic component has a density at the second surface that is between about 0.1% and about 20% lower than at the first surface. Further, in some cases, the lubricious component and the ceramic component can have the same density gradient in the preform.

Other embodiments of the invention provide methods for making a metal matrix composite article (e.g., a wear plate). The method includes steps of providing a slurry including a ceramic component and a lubricious component, depositing the slurry into a first mold, forming a preform, wherein the ceramic component and the lubricious component have a specified density gradient in a flow direction, removing the preform from the first mold, depositing the preform into a second mold, the second mold being shaped as a desired metal matrix composite article (e.g., a wear plate), depositing a metal component into the second mold, wherein the ceramic component, the lubricious component and the metal component form the desired metal matrix composite article (e.g., a wear plate) and removing the desired metal matrix composite article from the second mold.

Further embodiments of the invention provide methods for making a fifth wheel hitch with an integral wear plate. One method includes steps of providing a preform, wherein the preform is shaped as a wear plate having a first surface and a second surface, wherein the preform comprises a ceramic component and a lubricious component, wherein the lubricious component has a density that is highest at the first surface and is lowest at the second surface, and wherein the ceramic component has a density that is highest at the first surface and is lowest at the second surface, depositing the preform into a fifth wheel hitch bearing plate mold and depositing a metal component into the fifth wheel hitch bearing plate mold, wherein the metal component both forms the fifth wheel hitch and infiltrates the preform to form a wear plate integral to the fifth wheel hitch.

Another method for making a fifth wheel hitch with an integral wear plate includes steps of providing a slurry including a ceramic component and a lubricious component, depositing the slurry into a first mold, forming a preform, wherein the ceramic component and the lubricious component have a specified density gradient in a flow direction, removing the preform from the first mold, depositing the preform into a second mold, the second mold being shaped as a wear plate, depositing a metal component into the second mold, wherein the ceramic component, the lubricious component and the metal component form the wear plate, removing the wear plate from the second mold, inserting the wear plate into a fifth wheel hitch bearing plate mold and depositing a fifth wheel hitch forming material into the fifth wheel hitch bearing plate mold such that the fifth wheel hitch forming material surrounds the wear plate.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

FIGS. 1-4 illustrate a fifth wheel hitch 100 according to one embodiment of the invention. The fifth wheel hitch 100 includes a hitch bearing plate 10 having an upper surface 12. The hitch bearing plate 10 has a generally centrally located kingpin hole 14. The hitch bearing plate upper surface 12 includes two low-friction and mechanically durable wear plate components 16a, 16b. Skilled artisans will understand that while the embodiment if FIGS. 1-4 show two wear plate components 16a, 16b, a single wear plate component or more than two wear plate components can be used instead.

Each wear plate component 16a, 16b has a substantially crescent shape. Each wear plate component 16a, 16b also has an inner side edge 18a, 18b that faces the direction of the kingpin hole 14. Each inner side edge 18a, 18b also forms the inner or concave edge of the crescent shape. Skilled artisans will also understand that while the embodiment of FIGS. 1-4 show wear plate components 16a, 16b having a substantially crescent shape, other shapes and configurations can be used instead.

Each wear plate component 16a, 16b can secure to the hitch bearing plate upper surface 12 by any appropriate means. In FIGS. 1-4, however, the wear plate components 16a, 16b are first formed separately from the hitch bearing plate 10 and then are mechanically secured to the upper surface with a plurality of bolts 20. The wear plate components 16a, 16b have a first surface 22 and a second surface 24. Generally, the wear plate components 16a, 16b are mechanically secured to the upper surface 12 such that the first surface 22 forms an exposed surface and the second surface faces the hitch bearing plate 10.

Figure 5:
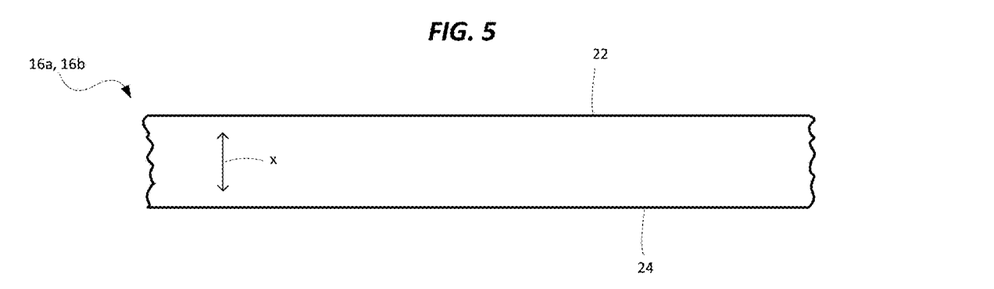
FIG. 5 is a side cross-sectional view of a wear plate component according to one embodiment.
Figure 6:
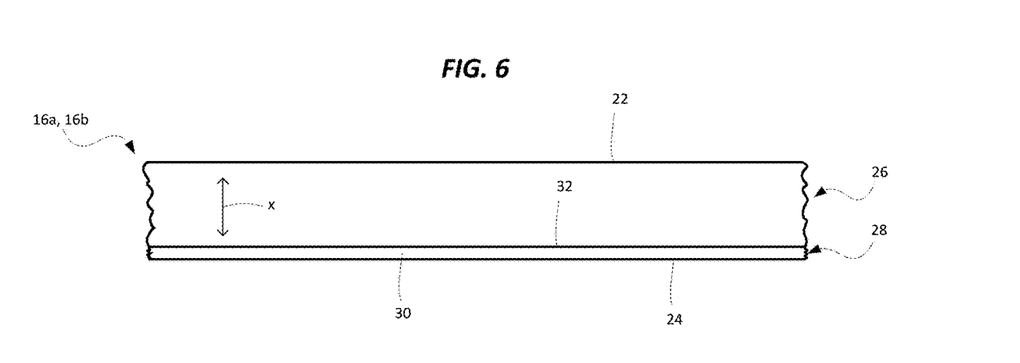
FIG. 6 is a side cross-sectional view of a wear plate component according to another embodiment, the wear plate component having a monolithic backing.
Figure 7:
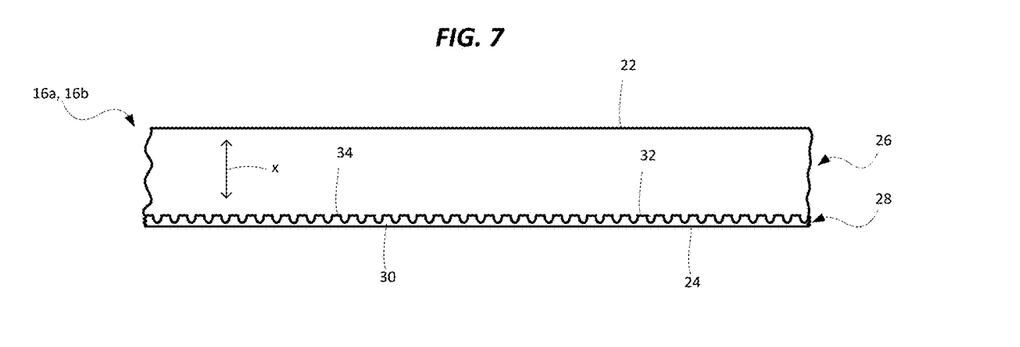
FIG. 7 is a side cross-sectional view of a wear plate component according to another embodiment, the wear plate component having a plurality of bumps extending into the monolithic backing.

FIGS. 5-7 each illustrate a different embodiment of a wear plate component 16a, 16b. In each embodiment, the wear plate component 16a, 16b includes a first surface 22 and a second surface 24. The first surface 22 forms the exposed surface when the wear plate component 16a, 16b is secured to the hitch bearing plate 10. The second surface 24 faces the hitch bearing plate 10.

In FIG. 5, the entire wear plate component 16a, 16b, extending from the first surface 22 to the second surface 24, comprises, consists essentially of, or consists of a metal component, a ceramic component and a lubricious component. In this embodiment, the entire wear plate component 16a, 16b forms a single region. Each the metal component, the ceramic component and the lubricious component have a total fraction volume gradient in the flow direction "x". In other words, the total fraction volume gradient extends entirely from the first surface 22 to the second surface 24. The lubricious component has a total fraction volume gradient such that the first surface total fraction volume is higher than the second surface total fraction volume. Also, the ceramic component has a total fraction volume gradient such that the first surface total fraction volume is higher than the second surface total fraction volume. Finally, the metal component has a total fraction volume gradient such that the second surface total fraction volume is higher than the first surface total fraction volume. In FIG. 5, the lubricious component and the ceramic component have the highest total fraction volume at the first surface 22 and the metal component has the highest total fraction volume at the second surface 24. In each case, the total fraction volume gradients can be a continuous gradient, a step gradient or a combination gradient thereof.

In FIG. 6, the wear plate component 16a, 16b includes a first region 26 and a second region 28. The first region 26 includes comprises, consists essentially of, or consists of a metal component, a ceramic component and a lubricious component having the total fraction volume gradients in the direction "x" as described in the embodiment of FIG. 5 above. The second region 28 comprises, consists essentially of, or consists of the metal component but not the ceramic component or the lubricious component. In other words, the total fraction volume gradient only extends along a portion of the wear plate, i.e. only along the first region 26. The second region 28 does not have a total fraction volume gradient. In this embodiment, the second region 28 serves as a monolithic backing 30 to the first region 26. Such a monolithic backing 30 provides additional mechanical durability to the wear plate component 16a, 16b. In FIG. 6, the lubricious component and the ceramic component have the highest total fraction volume at the first surface 22 and the metal component has the highest total fraction volume throughout the monolithic backing 30. Additionally, within the first region 26, the metal component has a first surface total fraction volume that is lower than the total fraction volume at on interface 32 between the first region 26 and the second region 28.

The embodiment of FIG. 7 is similar to the embodiment of FIG. 6 except that the first region 26 and the second region 28 have a textured interface 32. In FIG. 6, the interface 32 is generally smooth and void of any texture. However, in FIG. 7, the interface 32 includes a texture such as surface bumps 34. In certain cases, the monolithic backing 30 of the second region 28 includes a plurality of bumps 34 at the interface 32. Of course, skilled artisans will understand that the first region 26 can instead have the plurality of bumps at the interface 32. This textured interface 32 helps to promote adhesion between the first region 26 and the second region 28. In FIG. 7, the lubricious component and the ceramic component have the highest total fraction volume at the first surface 22 and the metal component has the highest total fraction volume throughout the monolithic backing 30. Also, the metal component has a first surface total fraction volume that is lower than the total fraction volume at the interface.

In FIGS. 1-4, the wear plate components 16a, 16b each have the embodiment of FIG. 7, although this is not required. Perhaps best shown in FIG. 3 and FIG. 4, the wear plate component 16b has a first region 26 and a second region 28. The first region 26 includes the metal components, lubricious component and ceramic component in a specified total fraction volume gradient. However, the second region 28 includes the metal component but not the lubricious component or the ceramic component and does not have a total fraction volume gradient. Rather, the second region 28 forms a monolithic backing 30. Also, as shown, the first region 26 and the second region 28 include a textured interface 32. Further, the monolithic backing 30 includes a plurality of bumps 34 at the interface 32.

The fifth wheel hitch 100 (including the hitch bearing plate 10) comprises, consists essentially of or consists of a fifth wheel hitch material. In some cases, the fifth wheel hitch material is a metal. In certain cases, the fifth wheel hitch material is the same as the metal component. In the embodiment of FIGS. 1-4, the wear plate components 16a, 16b include a monolithic backing 30. As such, the fifth wheel hitch material can also be the same as the monolithic backing material.

In each of the wear plate component embodiments described above, the metal component can include a metal selected from aluminum, magnesium, titanium, steel and alloys thereof. The ceramic component can include component selected from silicon carbide, alumina, zirconia, silica or mixtures thereof. The lubricious component can include a component selected from graphite, tungsten disulfide, molybdenum disulfide or mixtures thereof.

In one particular embodiment, the wear plate has a ceramic component comprising, consisting essentially of or consisting of silicon carbide, alumina and silica, a lubricious component comprising, consisting essentially of or consisting of tungsten disulfide and graphite and a metal component comprising, consisting essentially of or consisting of aluminum. In another embodiment, the wear plate has a ceramic component comprising, consisting essentially of or consisting of alumina and silica, a lubricious component comprising, consisting essentially of or consisting of tungsten disulfide and graphite and a metal component comprising, consisting essentially of or consisting of aluminum.

In another embodiment, the wear plate has a ceramic component comprising, consisting essentially of or consisting of silicon carbide, alumina, zirconia and silica, a lubricious component comprising, consisting essentially of or consisting of tungsten disulfide and graphite and a metal component comprising, consisting essentially of or consisting of aluminum. Finally, in another embodiment, the wear plate has a ceramic component comprising, consisting essentially of or consisting of alumina, zirconia and silica, a lubricious component comprising, consisting essentially of or consisting of tungsten disulfide and graphite and a metal component comprising, consisting essentially of or consisting of aluminum.

Referring back to FIGS. 5-7, in certain cases, the lubricious component has a first surface total fraction volume in the range of about 1% to about 20% or perhaps in the range of about 5% to about 20%. In some cases, the second surface total fraction volume is between about 0.1% to about 100% less than the first surface total fraction volume. Also, in certain cases, the ceramic component has a first surface total fraction volume in the range of about 20% to about 50% or perhaps in the range of about 15% to about 35%. In some cases, the second surface total fraction volume is between about 0.1% to about 100% less than the first surface total fraction volume. Further, in certain cases, the metal component has a second surface total fraction volume in the range of about 80% and 100%. In some cases, the second surface total fraction volume is between about 0.1% to about 60% higher than the first surface total fraction volume.

In some cases, the lubricious component and ceramic component together can have a total fraction volume of between about 20% and about 40% at the first surface and the metal component can have a total fraction volume of between about 60% to about 80% at the first surface. Also, the lubricious component and ceramic component can together have a total fraction volume of between about 0% and about 40% at the second surface and the metal component can have a total fraction volume of between about 60% to about 100% at the second surface.

The wear plate total fraction volume grading feature allows for the wear plate components 16a, 16b to have a first surface 22 that has increased lubricity and a second surface 24 that has increased mechanical durability. Thus, the wear plate components 16a, 16b have both low-friction properties and a mechanical durability that is higher than polymeric articles or articles made from uniformly mixed composite articles. For example, in some cases, the wear plate components 16a, 16b may last as long as the fifth wheel hitch itself, such as up to 5 years. This is much improved over a life span of a polymeric article, which typically has a life span of about 2 years.

In some embodiments, the wear plate components 16a, 16b have certain locations with a thickness and/or composition that is different from the remainder of the wear plate. Such a different thickness or composition can provide added functionality, such as additional reinforcement and enhanced lubricious qualities. Referring back to FIG. 1, in some cases, a location of reinforcement is provided along the inner edge 18a, 18b of each wear plate component 16a, 16b. For example, in certain embodiments, the reinforcement location extends along each inner edge 18a, 18b and extends inwardly at a predetermined distance. Each inner edge 18a, 18b faces the king pin hole and thus is an area where the kingpin is more likely to crash into one of the wear plate components 16a, 16b during semi-tractor to semi-trailer connecting. In certain embodiments a reinforcement location may also or instead be located near a front edge 19a, 19b, of each wear plate component 16a, 16b near the tongue of the fifth wheel hitch. The reinforcement location may extend back away from the front edge at a predetermined distance, providing reinforcement at that part of the wear plate components 16a, 16b first likely to be hit by a misaligned kingpin.

Figure 1:
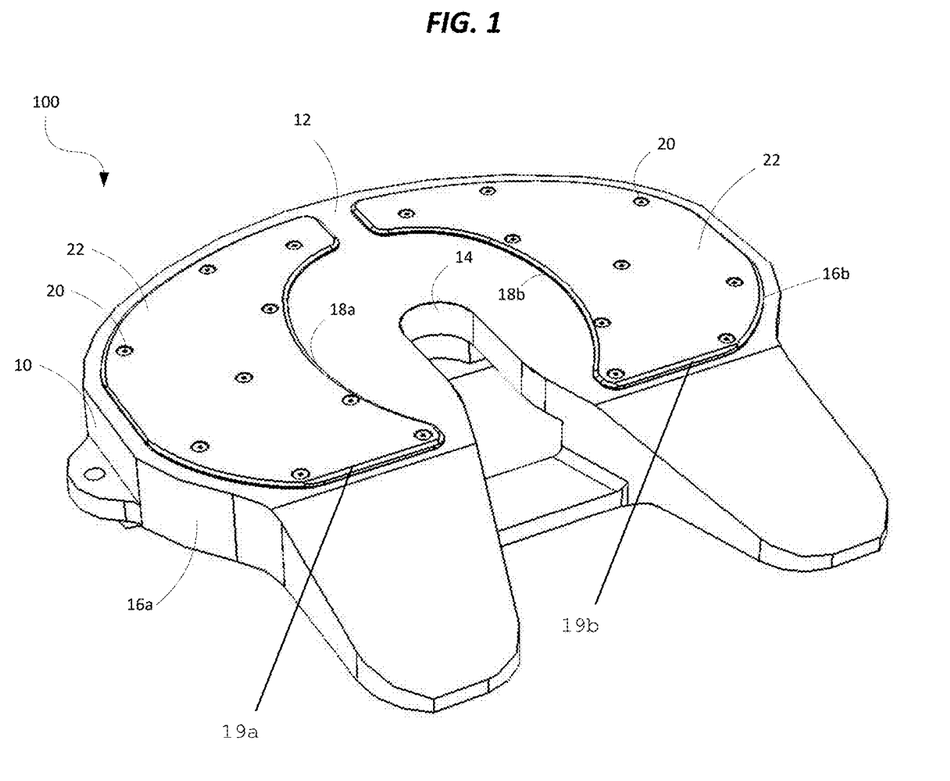
FIG. 1 is a perspective view of a fifth wheel hitch having two wear plate components that are mechanically secured to a hitch bearing plate.
Figure 2:
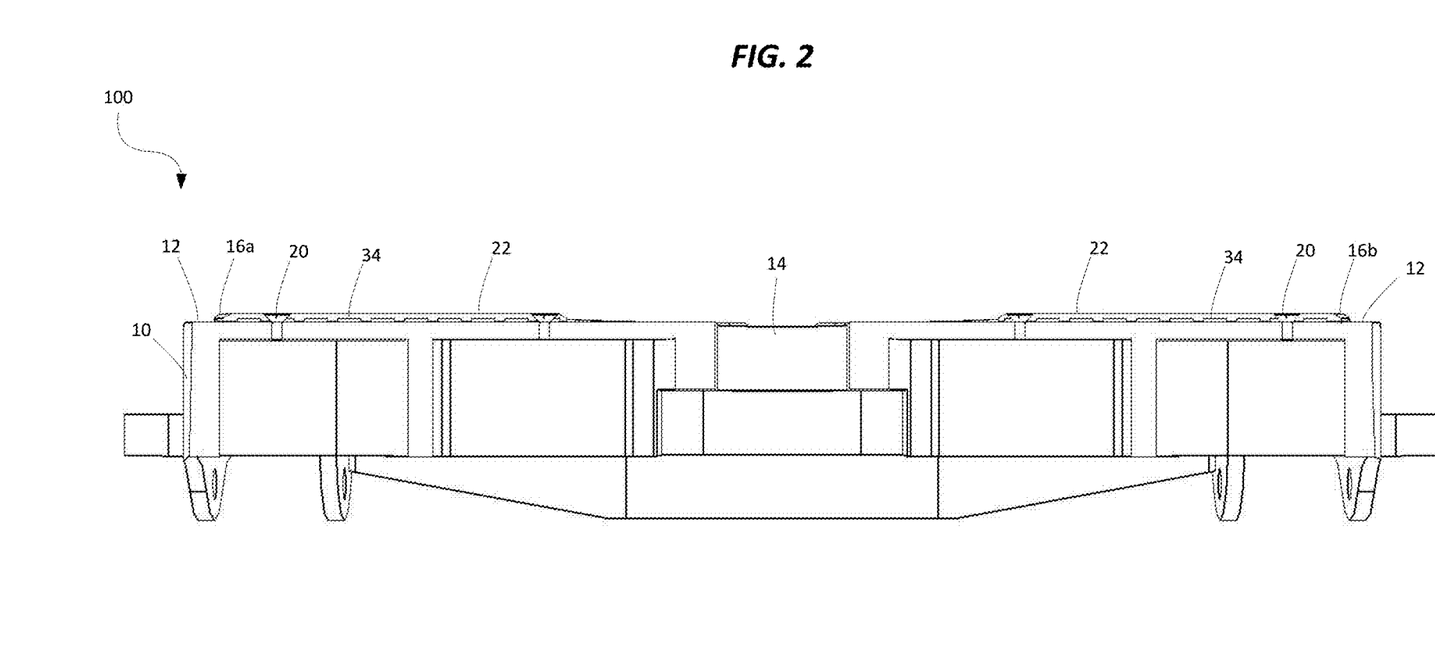
FIG. 2 is a side cross-sectional view of a fifth wheel hitch of FIG. 1.
Figure 3:
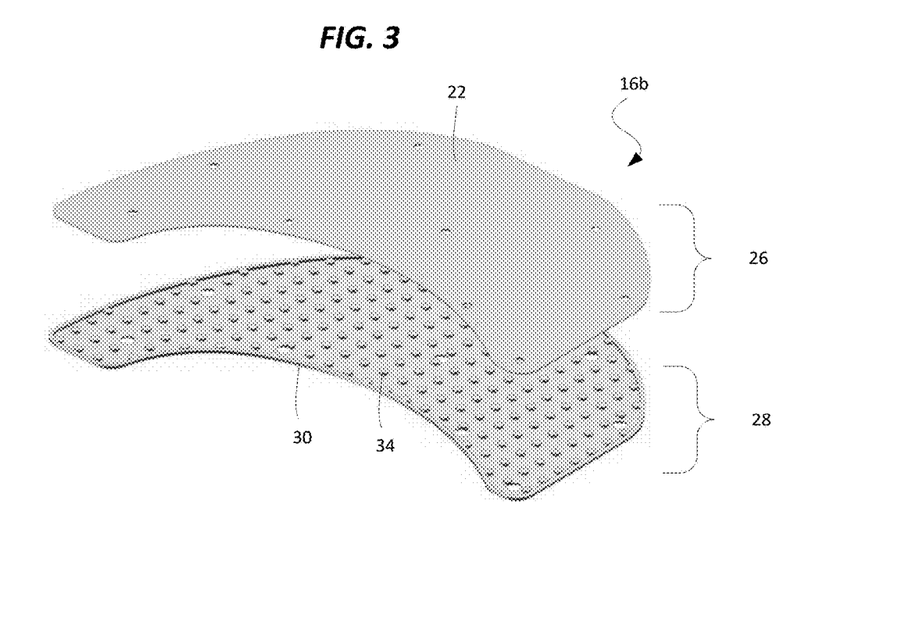
FIG. 3 is a perspective exploded view of a wear plate component of FIG. 1.
Figure 4:
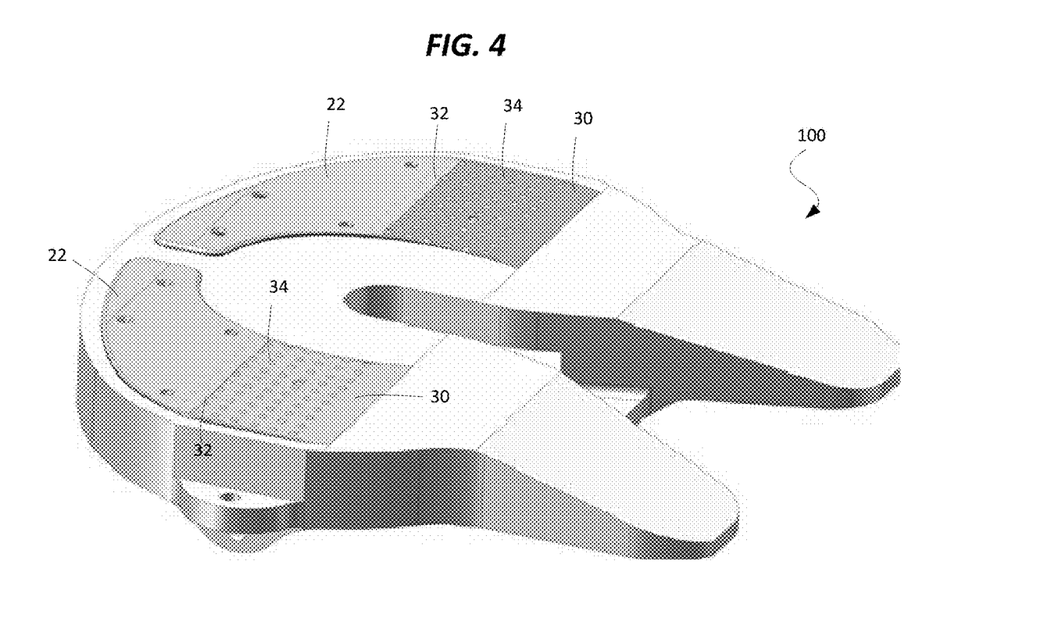
FIG. 4 is a perspective view of the fifth wheel hitch of FIG. 1, wherein portions of the wear plate components are exposed to show the underlying monolithic backings.

In certain embodiments, areas within the reinforcement locations have a thickness that is greater than the thickness of wear plate component areas that are not within the location of reinforcement. In some cases, areas within the reinforcement locations have a thickness that is between about 0.1 inches to about 0.25 inches greater than areas outside the location of reinforcement. In other cases, areas outside the reinforcement locations can have a thickness of about 0.3 inches and the areas within the reinforcement locations can have a thickness that is greater. In other embodiments, areas within the reinforcement locations have a composition that is different than the composition areas outside the reinforcement locations.

Other embodiments of the invention provide a wear plate preform having a ceramic component and a lubricious component in specified density gradients. The ceramic component and lubricious component can include any of the components already described above for the wear plate. The lubricious component has a density gradient such that the first surface density is higher than the second surface density. Also, the ceramic component has a density gradient such that the first surface density is higher than the second surface density. In some cases, the lubricious component and the ceramic component have the highest density at the first surface and the metal component has the highest density at the second surface. In each case, the density gradients can be a continuous gradient, a step gradient or a combination gradient thereof. Further, in some cases, the lubricious component and the ceramic component can have the same density gradient in the preform.

In certain embodiments, the lubricious component in the preform has a density of between about 5% and about 20% at the first surface. In other cases, the lubricious component has a density at the second surface that is between about 0.1% and about 20% lower than at the first surface. Likewise, the ceramic component can have a density of between about 80% and about 95% at the first surface. In other cases, the ceramic component has a density at the second surface that is between about 0.1% and about 100% lower than at the first surface.

In other embodiments, the lubricious component in the preform has a total fraction volume in the range of about 1% to about 20% or perhaps in the range of about 5% to about 20% at the first surface. Likewise, the ceramic component can have a total fraction volume in the range of about 20% to about 50% or perhaps in the range of about 15% to about 35% at the second surface.

Figure 8:
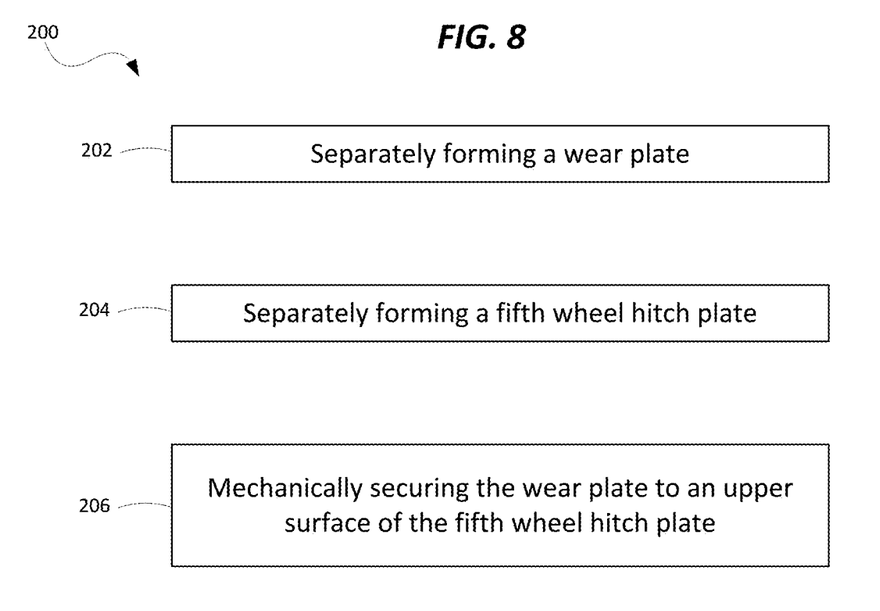
FIG. 8 is a process chart showing steps in a method of providing a wear plate on a fifth wheel hitch plate according to one embodiment.

The invention also provides methods of making a fifth wheel hitch with a wear plate. FIG. 8 is a process chart showing steps in a method 200 of providing a wear plate on a fifth wheel hitch plate according to one embodiment. The method 200 includes separately forming a wear plate at step 202, separately forming a fifth wheel hitch plate at step 204 and mechanically securing the wear plate to an upper surface of the fifth wheel hitch plate at step 206.

Figure 9:
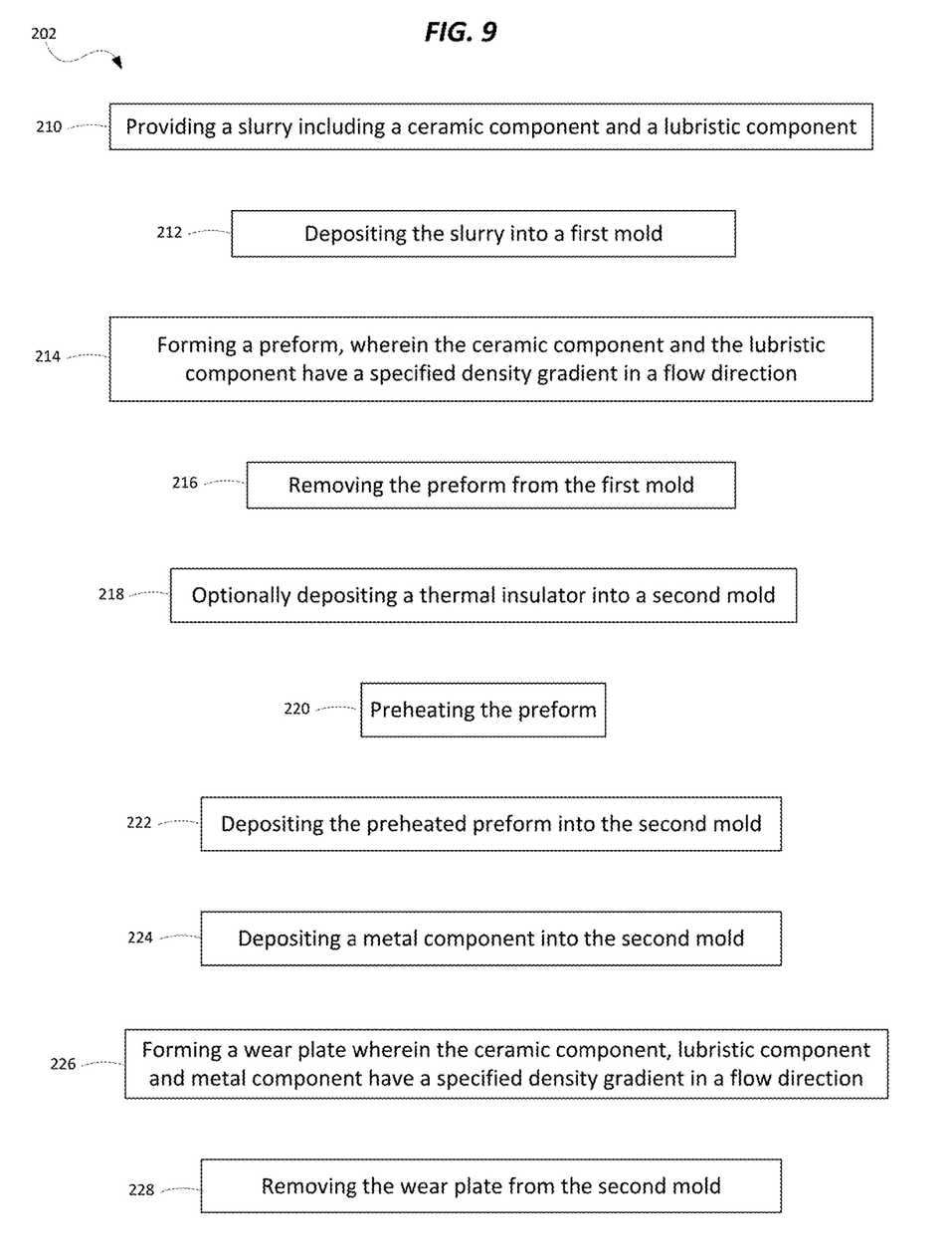
FIG. 9 is a process chart showing steps in a method of forming a wear plate according to one embodiment.

FIG. 9 is a process chart showing steps in a method 202 of forming a wear plate (or components for a wear plate) according to one embodiment. While this method describes forming a wear plate, skilled artisans will understand that the method can be used to prepare any other desired metal matrix composite article. The method 200 includes providing a slurry including both a ceramic component and a lubricious component at step 210. As used herein, the term "slurry" includes a fluid mixture such as a solution, colloidal mixture or colloidal suspension comprising at least the ceramic component and the lubricious component. The slurry can also include a binder component and a liquid component. In one embodiment, the slurry includes the ceramic component in a weight percent of between 2% and 20% and the lubricious component in a weight percent of between 0.5% and 10% with the remaining weight percent being for the binder component and the liquid component.

In one particular embodiment, the slurry has a ceramic component comprising, consisting essentially of or consisting of silicon carbide, alumina and silica and a lubricious component comprising, consisting essentially of or consisting of tungsten disulfide and graphite. In another embodiment, the slurry has a ceramic component comprising, consisting essentially of or consisting of alumina and silica and a lubricious component comprising, consisting essentially of or consisting of tungsten disulfide and graphite. In another embodiment, the slurry has a ceramic component comprising, consisting essentially of or consisting of silicon carbide, alumina, zirconia and silica and a lubricious component comprising, consisting essentially of or consisting of tungsten disulfide and graphite. Finally, in another embodiment, the slurry has a ceramic component comprising, consisting essentially of or consisting of alumina, zirconia and silica and a lubricious component comprising, consisting essentially of or consisting of tungsten disulfide and graphite.

The method 202 further includes depositing the slurry into a first mold at step 212 and forming a preform at step 214. The slurry is deposited under pressure to form a preform that has a density that changes in a particular flow direction. As such, the ceramic component and the lubricious component have a specified density gradient in a flow direction. As used in connection with a preform, the term "density" refers to porosity such that a higher density indicates a lower porosity and a lower density indicates a higher porosity.

The method 202 also includes drying and firing the preform and removing the preform from the first mold at step 216. Methods of preparing a preform having a density gradient are described in U.S. Pat. No. 8,075,827, the entire contents of which are incorporated herein by reference. Any of the methods described in U.S. Pat. No. 8,075,827 can be used to prepare the preform so that it has the specified density gradient.

The method 202 further includes an optional step 218 of depositing a thermal insulator into a second mold. Thermal insulators and methods of depositing thermal insulators into a mold are described in U.S. Pat. No. 9,180,511 and U.S. patent application Ser. No. 13/836,001, the entire contents of which are incorporated herein by reference. Any of the methods described in U.S. Pat. No. 9,180,511 or U.S. patent application Ser. No. 13/836,001 can be used to deposit the thermal insulator into the second mold.

The method 202 also includes preheating the preform at step 220 and depositing the preform into the second mold at step 222. The second mold is sized and shaped to form a wear plate or wear plate component. The preform can be preheated before being deposited into the second mold so that the preform substantially fills the entire second mold. The method 202 next includes depositing a metal component into the second mold at step 224 and then forming a wear plate at step 226. In certain cases, step 226 of forming the wear plate can include pressurizing the second mold so that the metal component flows through the pores in the preform. Finally, once the wear plate is formed, it can be removed from the second mold at step 228.

Figure 10:
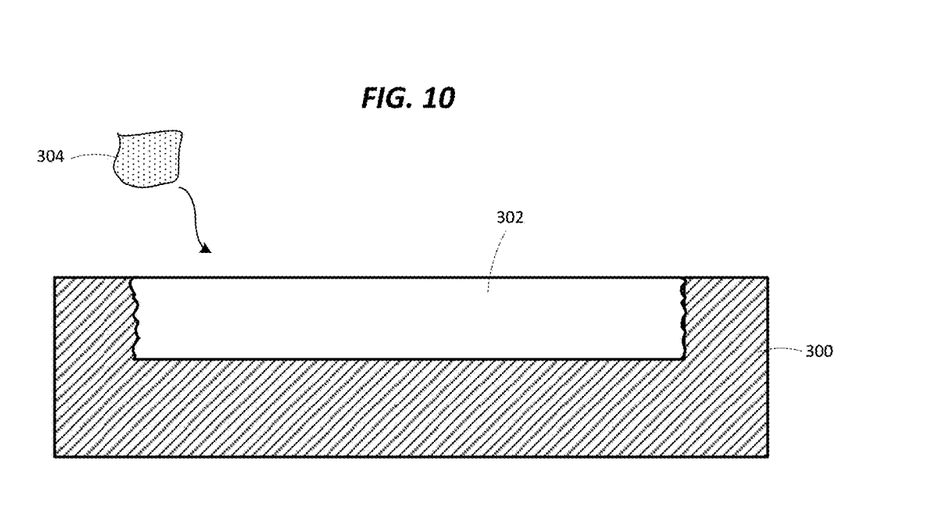
FIG. 10 is a side cross-sectional view of a wear plate preform positioned inside of a wear plate mold cavity according to one embodiment, the wear plate preform being positioned directly on top of a wear plate mold cavity surface.
Figure 11:
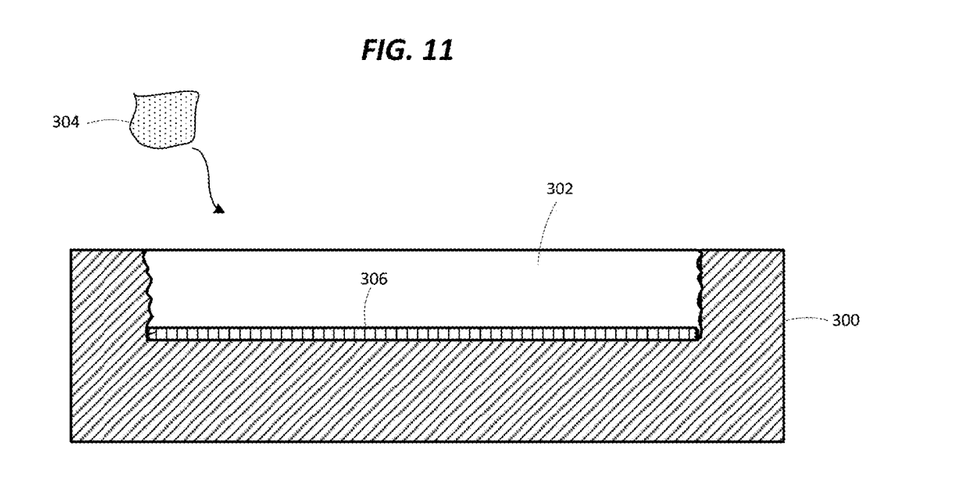
FIG. 11 is a side cross-sectional view of a wear plate preform positioned inside of a wear plate mold cavity according to another embodiment, wherein a sacrificial preform separates the wear plate preform from a wear plate mold cavity surface.
Figure 12:
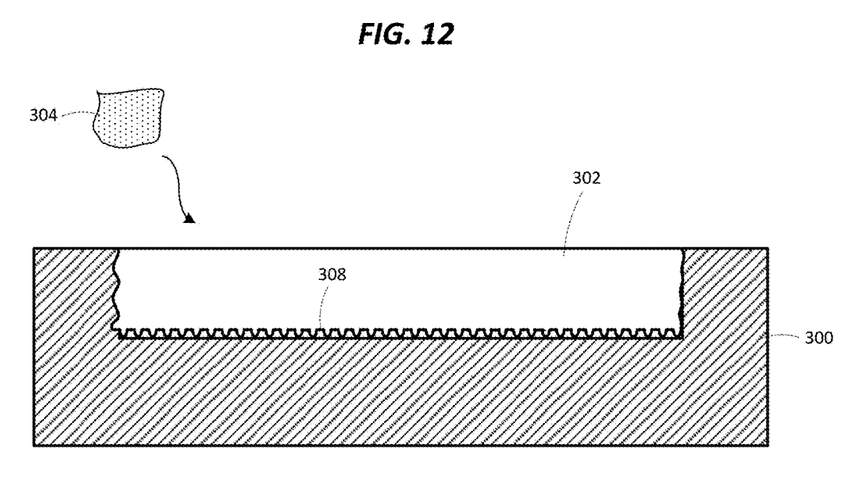
FIG. 12 is a side cross-sectional view of a wear plate preform positioned inside of a wear plate mold cavity according to another embodiment, the wear plate preform having a plurality of bumps separating the wear plate preform from a wear plate mold cavity surface.

FIGS. 10-12 illustrate different preforms and portions of a second mold 300 that can be used to perform the method 202 of FIG. 9. In FIG. 10, a preform 302 is deposited into the second mold 300 such that the entire preform 302 substantially fills the mold cavity. Once the preform is deposited into the second mold 300, a metal component 304 deposited. The metal component flows through the pores in the preform 302. The preform and second mold of FIG. 10 produces a wear plate having an embodiment shown in FIG. 5.

In FIG. 11, a sacrificial preform 306 is first deposited into the second mold 300 and then the preform 302 is deposited over the sacrificial preform 306. A metal component 304 is deposited and both replaces the area occupied by the sacrificial preform 306 and flows through the pores in the preform 302. In FIG. 11, the area occupied by the preform 302 forms a first region and the area occupied by the sacrificial perform 306 forms a second region of the resulting wear plate. The metal component 304 thus forms a monolithic backing in the second region area. The preform and second mold of FIG. 11 produces a wear plate having an embodiment shown in FIG. 6.

In FIG. 12, the preform 302 has a textured surface 308. The textured surface 308 can be in the form of bumps and hollows or any other desired texture. The preform 302 is deposited into the second mold 300 such that a space is created between the textured surface 308 and the mold cavity. A metal component 304 is deposited and both fills in the space between the textured surface 308 and mold cavity and flows through the pores in the preform 302. In FIG. 12, the area occupied by the preform 302 forms a first region and the space between the textured surface 308 and mold cavity forms a second region of the resulting wear plate. The metal component 304 thus forms a monolithic backing in the second region area. The first region and the second region also have a textured interface 308. The preform and second mold of FIG. 12 produces a wear plate having an embodiment shown in FIG. 7.

Figure 13:
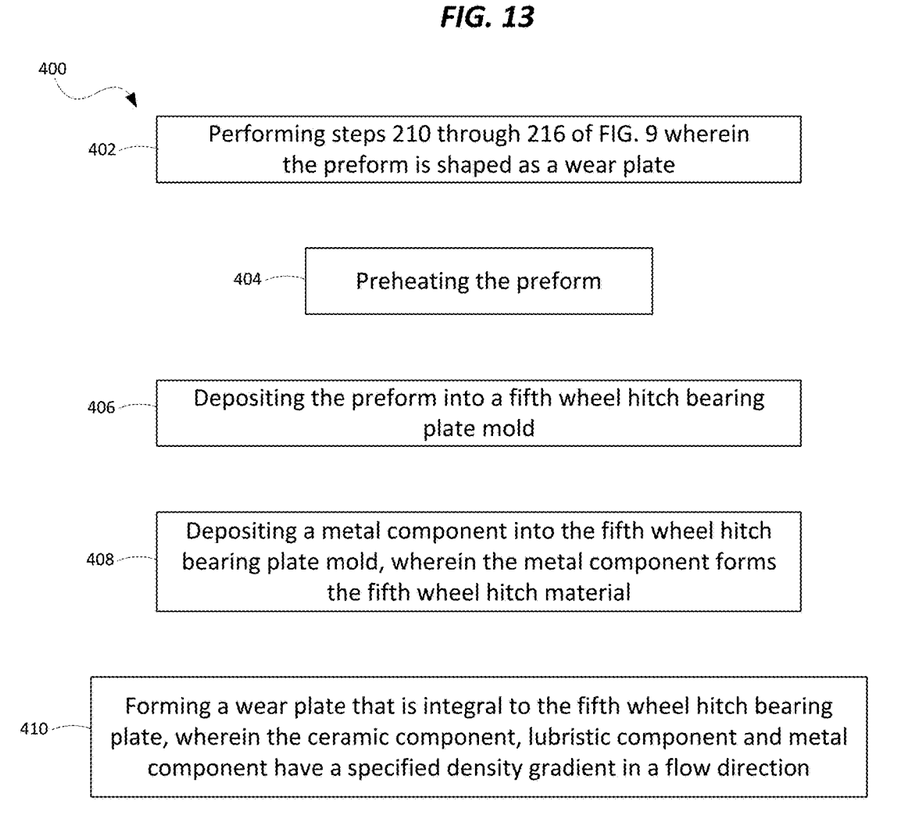
FIG. 13 is a process chart showing steps in a method of forming a wear plate that is integral to a fifth wheel hitch plate according to one embodiment.

FIG. 13 is a process chart showing steps in a method 400 of forming a wear plate that is integral to a fifth wheel hitch plate according to one embodiment. The method 400 includes performing steps 210 through 216 of FIG. 9 at step 402. Next, the method 400 includes preheating the preform at step 404 and depositing the preform into a fifth wheel hitch bearing plate mold at step 406. Skilled artisans will understand that the fifth wheel hitch bearing plate mold can be either a mold for the entire fifth wheel or a mold for the hitch bearing plate. In some cases, at step 406, the preform is deposited into a fifth wheel hitch bearing plate mold so that the first surface 22 faces the mold cavity. At step 408, the method 400 includes depositing a metal component into the fifth wheel hitch bearing plate mold. In other cases, step 408 is performed before step 406. Here, at step 408, the metal component is first deposited into the fifth wheel hitch bearing plate mold. At step 406, the preform is then deposited on top of the metal component such that the first surface 22 faces upward and it floats or suspends in the metal component. Next, additional metal component is deposited to infiltrate the preform. In some cases, the fifth wheel hitch material and the metal component are the same and this ensures integration of the wear plate within the fifth wheel hitch Finally, step 410 includes forming a wear plate that is integral to the fifth wheel hitch bearing plate, wherein the ceramic component, lubristic component and metal component have a specified density gradient in a flow direction.

Figure 14:
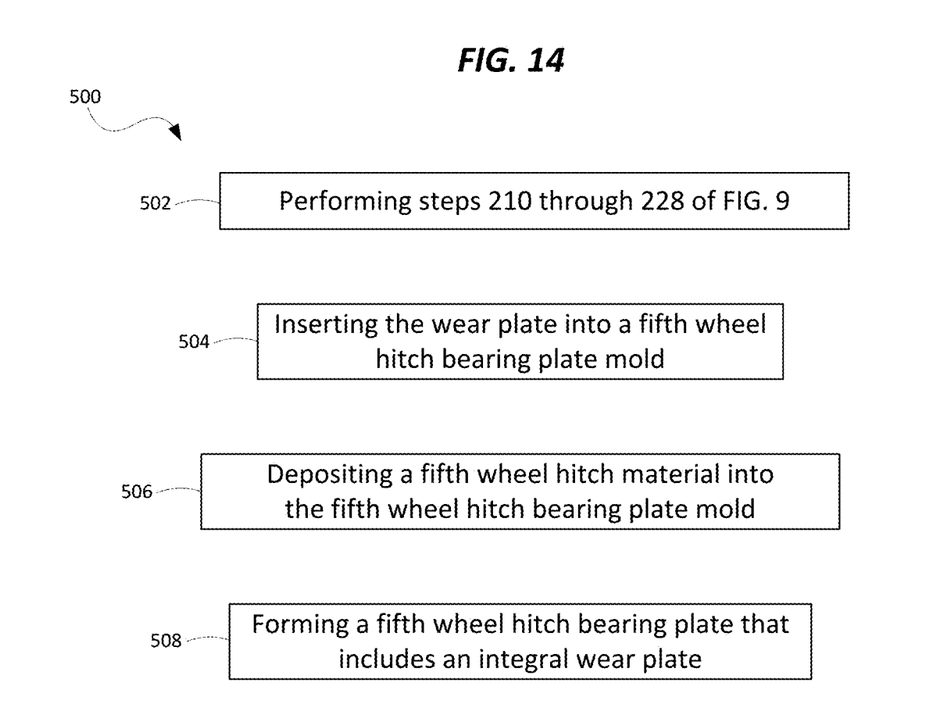
FIG. 14 is a process chart showing steps in a method of forming a wear plate that is integral to a fifth wheel hitch plate according to another embodiment.

FIG. 14 is a process chart showing steps in a method 500 of forming a wear plate that is integral to a fifth wheel hitch plate according to another embodiment. The method 500 includes performing steps 210 through 228 of FIG. 9 at step 502. Next, the method 500 includes inserting the wear plate into a fifth wheel hitch bearing plate mold at step 504. The wear plate in this method 500 serves as an insert. In some cases, at step 504, the wear plate is deposited so that the first surface 22 faces the mold cavity. At step 506, the method 500 includes depositing a fifth wheel hitch material into the fifth wheel hitch bearing plate mold. In other cases, step 506 is performed before step 504. Here, at step 506, the metal component is first deposited into the fifth wheel hitch bearing plate mold. At step 504, the wear plate is then deposited on top of the metal component such that the first surface 22 faces upward and the wear plate floats or suspends in the metal component. The fifth wheel hitch material can be the same as the metal component or it can be different. Finally, at step 508, the method includes forming a fifth wheel hitch bearing plate that includes an integral wear plate.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method of making a fifth wheel hitch with a wear plate, comprising the steps of:
    providing a slurry including a ceramic component and a lubricious component;
    depositing the slurry into a first mold;
    forming a preform, wherein the ceramic component and the lubricious component have a specified density gradient in a flow direction;
    removing the preform from the first mold;
    depositing the preform into a second mold, the second mold being shaped as a wear plate;

depositing a metal component into the second mold, wherein the ceramic component, the lubricious component and the metal component form the wear plate;

removing the wear plate from the second mold;

mechanically securing the wear plate to a fifth wheel hitch bearing plate.

2. The method of claim 1, further comprising a step of depositing a thermal insulator into the second mold before the step of depositing the preform into the second mold.

3. The method of claim 1, wherein the specified density gradient is an increase in porosity of the ceramic component and the lubricious component in the flow direction.

4. The method of claim 1, wherein the metal matrix composite article has a first surface and a second surface, wherein the lubricious component has a density that is highest at the first surface and is lowest at the second surface, wherein the ceramic component has a density that is highest at the first surface and is lowest at the second surface, and wherein the metal component has a density that is highest at the second surface and is lowest at the first surface.

5. The method of claim 1, wherein the metal component comprises a metal selected from the group consisting of aluminum, magnesium, titanium, steel and alloys thereof.

6. The method of claim 1, wherein the ceramic component comprises a component selected from the group consisting of silicon carbide, alumina, silica, zirconia and mixtures thereof.

7. The method of claim 1, wherein the lubricious component comprises a component selected from the group consisting of graphite, tungsten disulfide, molybdenum disulfide and mixtures thereof.

\* \* \* \* \*